United States Patent
Knodell, Jr. et al.

(10) Patent No.: US 8,561,788 B2
(45) Date of Patent: Oct. 22, 2013

(54) DIFFERENTIAL IMPULSE CONVEYOR WITH IMPROVED TRAY

(75) Inventors: Thomas G. Knodell, Jr., Keller, TX (US); Blake Svejkovsky, Coppell, TX (US); Kenneth C. Petri, Richardson, TX (US); Paul A. Svejkovsky, Rockwall, TX (US)

(73) Assignee: Paul Svejkovsky, Rockwall, TX (US)

( * ) Notice: Subject to any disclaimer, the term of this patent is extended or adjusted under 35 U.S.C. 154(b) by 87 days.

(21) Appl. No.: 13/218,210

(22) Filed: Aug. 25, 2011

(65) Prior Publication Data

US 2013/0048470 A1    Feb. 28, 2013

(51) Int. Cl.
*B65G 25/04* (2006.01)
(52) U.S. Cl.
USPC ............... 198/750.2; 198/750.1; 198/750.7
(58) Field of Classification Search
USPC .......... 198/750.1, 750.2, 750.5, 750.6, 750.7
See application file for complete search history.

(56) References Cited

U.S. PATENT DOCUMENTS

| | | | |
|---|---|---|---|
| 3,901,375 A | 8/1975 | Raque | |
| 3,960,266 A | 6/1976 | Becker | |
| 4,449,626 A | 5/1984 | Dodd | |
| 4,844,236 A | 7/1989 | Kraus | |
| 5,156,259 A * | 10/1992 | Quaeck | 198/750.2 |
| 5,351,807 A | 10/1994 | Svejkovsky | |
| 5,794,757 A | 8/1998 | Svejkovsky | |
| 6,189,683 B1 | 2/2001 | Svejkovsky et al. | |
| 6,357,578 B1 * | 3/2002 | Shelby | 198/750.2 |
| 6,415,911 B1 * | 7/2002 | Svejkovksy et al. | 198/750.1 |
| 6,896,121 B2 | 5/2005 | Vorsteher et al. | |
| 7,754,984 B2 * | 7/2010 | Sugioka et al. | 198/763 |
| 2001/0007300 A1 * | 7/2001 | Svejkovsky et al. | 198/750.7 |
| 2002/0022072 A1 | 2/2002 | Burke | |
| 2004/0163933 A1 | 8/2004 | Jones | |
| 2006/0011458 A1 * | 1/2006 | Purcocks | 200/310 |
| 2009/0229890 A1 * | 9/2009 | Sugioka et al. | 198/750.1 |
| 2011/0056806 A1 | 3/2011 | Johnson | |

OTHER PUBLICATIONS

International Searching Authority; International Search Report and the Written Opinion; Nov. 14, 2012.

* cited by examiner

*Primary Examiner* — James R Bidwell
(74) *Attorney, Agent, or Firm* — Streets & Steele

(57) ABSTRACT

A differential impulse conveyor (10) is provided for moving goods, including a tray (12) having a tray floor (14) supporting goods, with the tray movable in a forward direction and a backward direction. A drive motor (16) is provided for moving the tray floor in the forward direction and the backward direction. The tray floor includes plurality of dimples (20) each projecting upward from an adjacent product supporting surface (22) of the tray floor. Each dimple (20) includes an upwardly projecting pusher portion (24) for pushing goods forward during the forward movement of the tray, and a tapered ramp portion (26) extending upward from the product supporting surface and engaging the pusher portion for moving goods in front of the pusher portion.

16 Claims, 4 Drawing Sheets

DIFFERENTIAL IMPULSE CONVEYOR WITH IMPROVED TRAY

FIELD OF THE INVENTION

The present invention relates to a differential impulse conveyor for moving goods along a conveyor tray. More particularly, the invention relates to an improved tray for a differential impulse conveyor which is able to reliably move goods uphill along the tray, and which provides a more uniform travel rate of goods along the tray, thereby enhancing the reliability of a determination of the quantity of goods being moved along the conveyor.

BACKGROUND OF THE INVENTION

Various types of conveyors have been proposed for the food processing industry. Conveyors with a generally flat and unitary tray or pan floor are preferred from many applications since the product being conveyed contacts only the unitary tray, thereby contributing to easy cleaning and maintenance of the tray. Differential impulse conveyors are favored in many applications compared, for example, to vibratory conveyors because the product moving along the differential impulse tray is less susceptible to damage and to loss of seasoning from the product as it is transported along the conveyor.

One of the goals of a differential impulse conveyor for years has been to provide an assembly which reliably allows transported goods to be moved uphill. Uphill movement of the goods may be essential, for example, for downstream handling of the goods at the higher elevation. Current differential impulse conveyors with a flat tray floor can move goods up a slight incline in many applications, but frequently cannot move various types of goods up a substantial incline of, for example, six or eight degrees. A differential impulse conveyor with an uphill travel capability has long been desired to accommodate different food processing machine heights and/or to recirculate accumulated goods.

Another disadvantage of prior art differential impulse conveyors is the difficulty with determining the volume or the weight of the goods being transported. An accurate determination of the weight or the volume of the goods being transported is critical for many operations. During seasoning of goods, for example, the accurate determination of the weight of goods traveling past the conveyor at any point in time may be used to reliably adjust the seasoning rate applied to the product downstream from the conveyor. The weight of the goods on the tray is generally determined by a load cell on the conveyor which is responsive to the change in tray weight with the supported goods. This weight determination from the load cell may or may not be coupled with a product volume determination based on the sensed height of the goods being conveyed in a tray. Each of these measurements requires a determination of the travel rate of goods along the tray, and the travel rate of goods along a differential impulse conveyor tray is significantly affected by the changing height of the goods on the tray at any point in time. Accordingly, an accurate determination of the quantity of goods conveyed along the tray is lacking.

A differential impulse conveyor with a spiral tray for elevating goods moved along the tray is disclosed in U.S. Pat. No. 5,351,807. Another conveyor system involving a spiral drum engaging the outer edge of a belt is disclosed in U.S. Publication 2011/0056806. A special conveyor pan intended for use with base or gate conveyor is disclosed in U.S. Pat. No. 6,896,121. U.S. Pat. No. 3,960,266 uses a pusher bar to transfer goods from one conveyor to another conveyor. U.S. Pat. No. 3,901,375 discloses a product pusher on a belt conveyor. U.S. Pat. No. 6,189,683 discloses an improved drive for a differential impulse conveyor. A conveyor tray with dimples to eliminate excessive friction of products moving along a tray has been proposed by Gates Manufacturing.

The disadvantages of the prior art are overcome by the present invention, an improved differential impulse conveyor is hereinafter disclosed.

SUMMARY OF THE INVENTION

In one embodiment, a differential impulse conveyor is provided for moving goods, including a tray having a tray floor for supporting the goods, the tray being movable in a forward direction to move goods forward with the tray, and in a backward direction to slide goods along the tray during tray backward movement. The conveyor includes a drive motor for moving the tray in the forward direction and the backward direction.

The tray floor includes a plurality of dimples each projecting upward from the supporting surface of the tray, each dimple including an upwardly projecting pusher portion for pushing goods forward during forward motion of the conveyor tray, and a tapered ramp portion extending upward from the supporting surface of the tray floor and engaging the pusher portion and passing goods over the ramp portion and in front of the pusher portion. The differential impulse conveyor may be used for reliably transporting goods along an upwardly inclined tray floor, and may also be used to move goods along the tray at a substantially uniform travel rate, thereby providing a more accurate determination of the quantity of goods being moved along the conveyor.

These and further features and advantages of the present invention will become apparent from the following detailed description, wherein reference is made to the figures in the accompanying drawings.

DETAILED DESCRIPTION OF PREFERRED EMBODIMENTS

Figure 1:
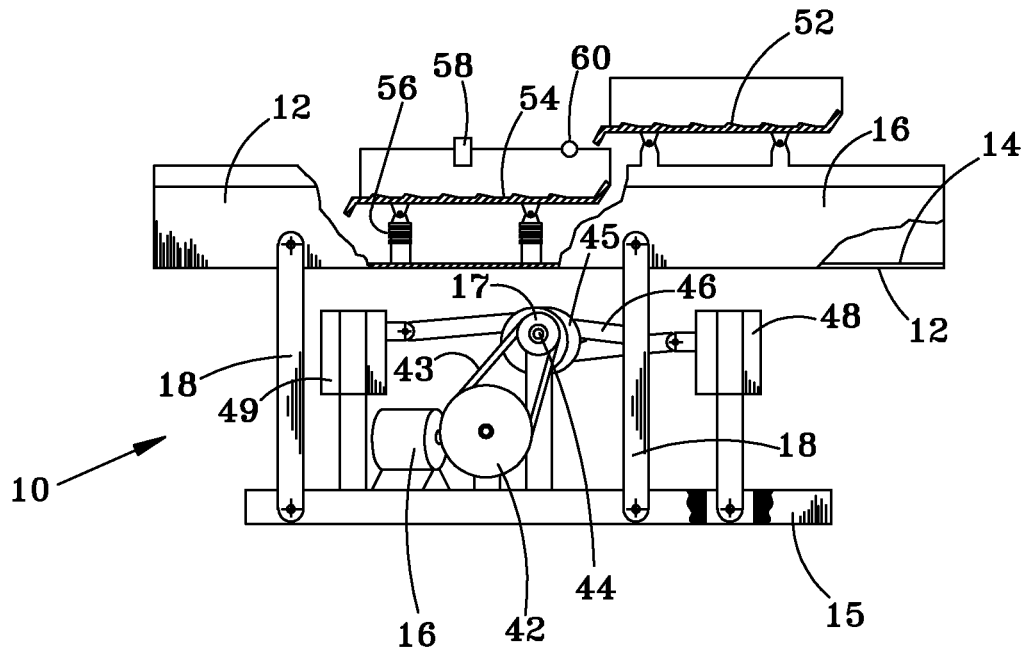
FIG. 1 is a side view of one embodiment of a differential impulse conveyor, including load cells for determining the weight of the goods on the conveyor tray.

FIG. 1 is a side view of one embodiment of the differential impulse conveyor 10 in accordance with the present invention. A primary conveyor tray or pan 12 includes a floor 14 for supporting goods thereon, such as food products being moved in a production and packaging facility. Tray sides 16 extend upward from the tray floor at each side of the tray. Tray 12 may be supported on four legs or support members 18, each pivotally attached to conveyor base 15 at their lower end and to the tray 12 at their upper end. Motor 16 powers a drive mechanism 17 which drives the legs 18 and thus the tray 12 in a forward direction so that the goods move forward with the tray, and in a backward direction at a greater speed, such that the goods slide with respect to the tray and thus "index" forward during each reciprocating cycle. The motor 16 may drive the tray in one direction, and allow a biasing member to drive the tray in the opposite direction. In either case, the drive motor 16 may be considered to power the tray in both directions. Further details with respect to a suitable motor and drive mechanism for a differential impulse conveyor may be found in U.S. Pat. Nos. 5,351,807, 5,699,089, 5,794,757, 6,189,683, and 6,145,911, each hereby incorporated by reference.

The drive mechanism 17 for powering the conveyor tray 12, as shown in FIG. 1, includes pulley 42 rotated by the motor 16, and belt 43 for driving pulley 44. The drive shaft 44 rotates eccentric pulley 45, which drives crank arm 46 connected to one of the legs 18. A similar crank arm may reciprocate counterweight 48 while another crank arm reciprocates counterweight 49 to ensure reliable and smooth operation of the drive mechanism.

Referring still to FIG. 1, tray 12 supports receiving tray 52. Product movement in FIG. 1 is right to left, and product loaded onto receiving tray 52 is thus input to weighing tray 54, with dimples on the planar supporting surface of both the receiving tray and the weighing tray. The product exiting the weighing tray 54 is fed onto the primary tray 12. The floor of the trays 52 and 54 thus includes a plurality of dimples thereon, and the dimples are discussed in detail subsequently. Each of the weighing tray 54 and the receiving tray 52 may be pivotally connected to and supported on the tray 12, so that each tray moves in the forward and reverse directions with the tray 12. Weighing tray 54 is supported on the tray 12 through the plurality of load cells 56 suitable for determining the weight of the goods on the weighing tray, as discussed subsequently.

Figure 3:
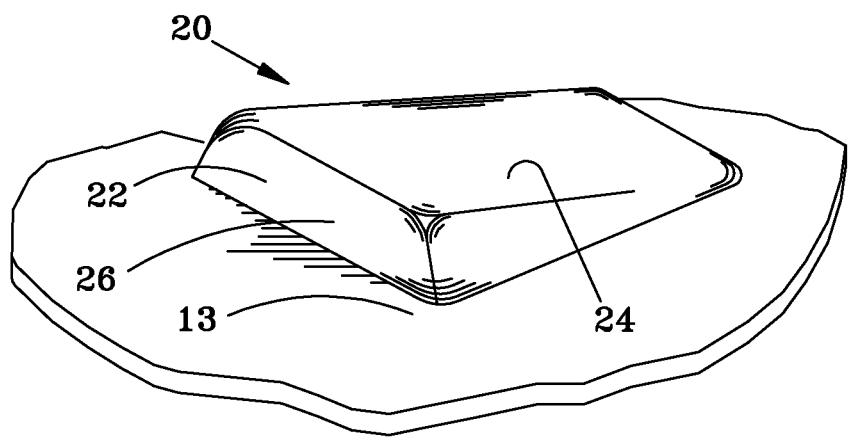
FIG. 3 is a pictorial view of a suitable dimple.

In the FIG. 1 embodiment, the tray floor 14 is essentially planar. The floor of the weighing tray 54 may be planar or non-planar, and is provided with a product supporting surface as discussed below surrounding each dimple 20 in the tray. Referring to FIG. 3, each dimple 20 includes an upwardly projecting pusher portion 22 extending upward from the adjacent product supporting surface 13 for pushing goods forward during the forward movement of the tray, and a tapered ramp portion 24 upstream from the pusher portion and extending upwardly from the product supporting surface 13 and engaging the pusher portion for passing goods in front of and optionally over the pusher portion during the return or backward movement of the tray.

Figure 2:
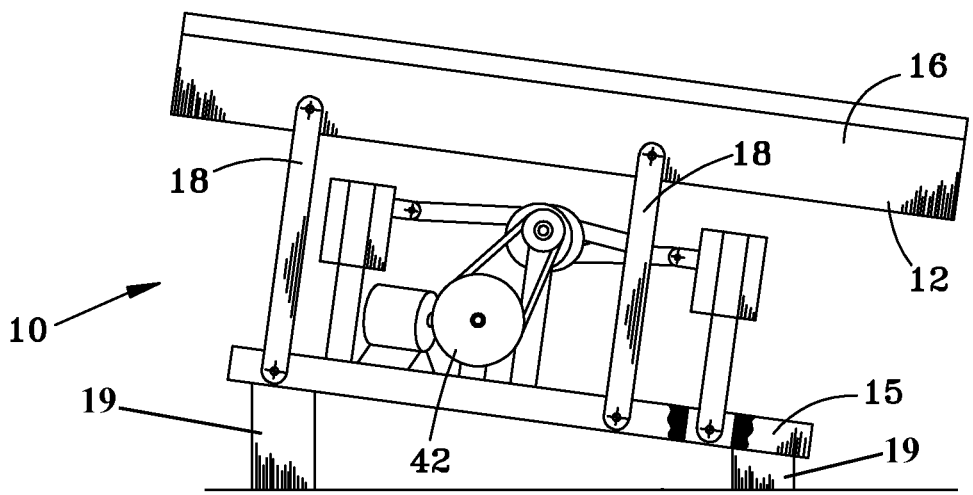
FIG. 2 is side illustration of a suitable differential impulse conveyor for moving goods up an incline.
Figure 16:
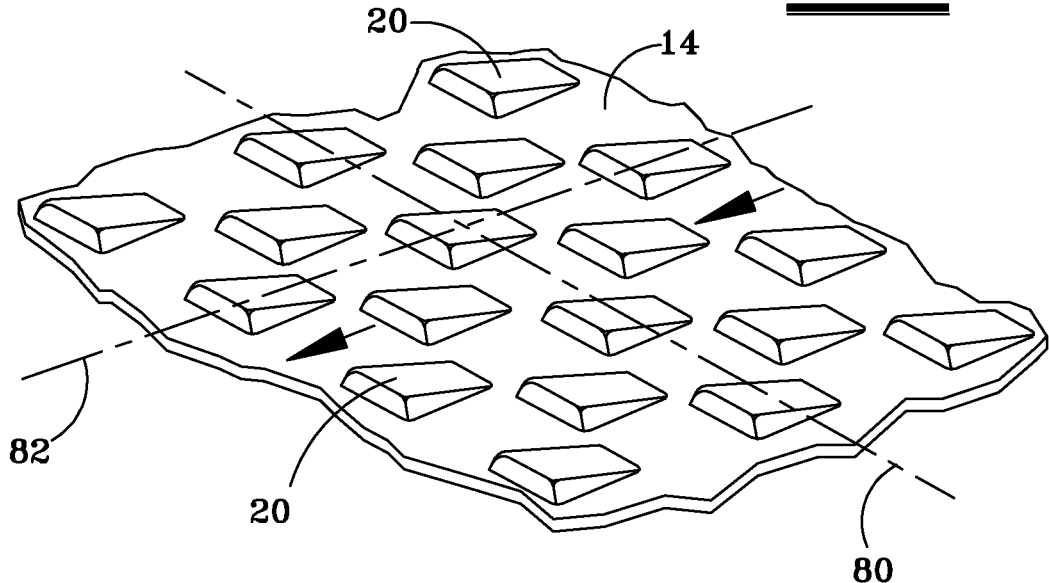
FIG. 16 illustrates dimples arranged in rows and columns on a tray floor.

FIG. 16 shows dimples 20 arranged on a tray floor 14 in a plurality of lateral rows 80 and columns 82, with the columns being generally parallel to the direction of travel of the goods. A row may be perpendicular or angled relative to the direction of travel of the goods, and the columns may be parallel with or angled relative to the direction of travel of the goods. As discussed subsequently, the dimples may be formed in a metal tray by the stamping or coining operation, which significantly reduces the cost of adding a plurality of dimples to an otherwise planar tray floor. The dimples significantly assist in moving goods along an upwardly inclined tray, as shown in FIG. 2 and discussed subsequently, and also assist in providing a much more uniform travel speed of product along the tray even though the bed depth or bed height of goods moving on the tray considerably varies. Dimples may be placed on all or a portion of the tray to accomplish the goal of reliably moving the mass of goods forward during forward movement of the tray, without adversely affecting sliding movement of the goods with respect to the tray during backward movement of the tray.

Figure 4:
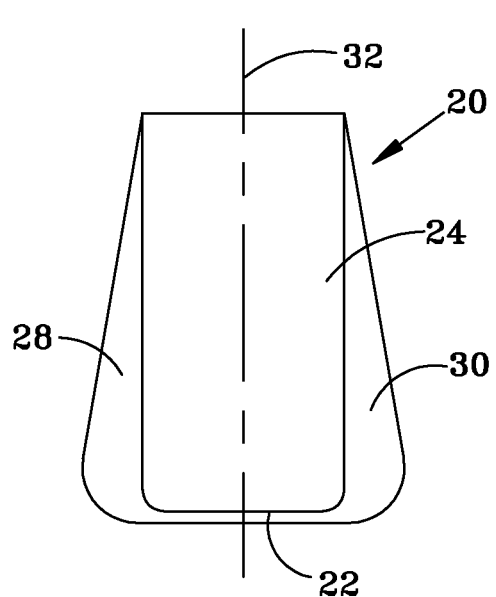
FIG. 4 is top view of the dimple shown in FIG. 3.
Figure 5:
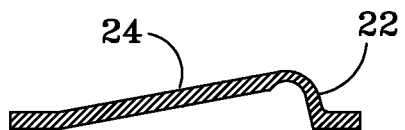
FIG. 5 is a cross-sectional view along the longitudinal centerline of a dimple shown in FIG. 3.
Figure 6:
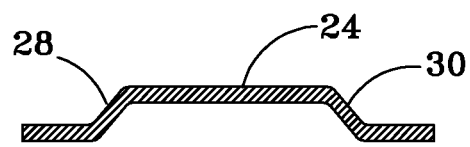
FIG. 6 is a lateral cross-sectional view of a dimple shown in FIG. 3.
Figure 8:
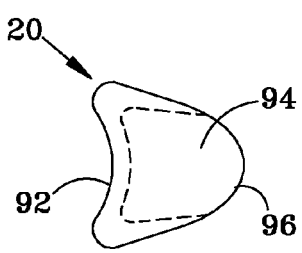
FIG. 8 is a top view of an alternative tray dimple.

Referring now to FIGS. 3-6, the pusher portion 22 of each dimple 20 projects upwardly from the tray at a rearwardly inclined angle, which preferably is from 90° to 50°, and more commonly from 90° to 70°. If the pusher portion were forwardly inclined, a crevice would be formed between the floor of the tray and the pusher portion which would be difficult to clean. If the pusher portion were inclined rearwardly at an angle less than 50°, some goods may be moved forward by the pusher portion, but other goods may slide backward up the pusher portion during forward movement of the tray, which is not desired. For the embodiment shown in FIG. 3, each pusher portion 22 includes a substantially planar pusher face 26 which is substantially perpendicular to the direction of travel of goods moving along the tray, as shown in FIG. 4. The pusher portion of each dimple alternatively may have a shallow V-shaped or U-shaped configuration with tapered pusher surfaces, as shown in FIG. 8. For both embodiments, the pusher face is still substantially perpendicular to the direction of goods moving along the conveyor.

Referring again to FIGS. 3 and 5, the ramp portion 24 of each dimple 20 includes angled side surfaces 28, 30 for deflecting at least some of the goods laterally away from a centerline 32 of each dimple. These ramp portions thus allow goods on the tray to pass by the ramp portion 24 and in front of the pusher portion 22. The goods which are deflected by the ramp portion thus preferably pass by the ramp portion and are then positioned directly in front of by the pusher portion so that the subsequent forward movement of the tray and the pusher portion 22 pushes those goods and the associated goods forward on the tray, with the mass of goods moving forward as a unit along the tray.

For the embodiment of the dimple 20 shown in FIG. 3, the ramp portion includes a center ramp which may be substantially planar, so that some of the goods pass over the ramp portion 24 and thus drop downward in front of the pusher portion 22, rather than being deflected laterally and then falling in front of the pusher portion due to the angled portions 28, 30.

Dimples 20 may be used to obtain the benefits of one or both of the following goals: (1) a mechanism to reliably move goods up an inclined tray, and (2) a mechanism to achieve a substantially constant travel rate of the goods moving along the tray with a varying bed depth of the goods on the tray. In either case, the dimples 20 may be positioned on the tray in a pattern whereby only part of the goods are contacted by the dimples, although all of the goods on the tray may be affected by the dimples as the goods travel as a mass along the tray, i.e., pushing one chip forward with the pusher plate not only moves that chip, but also the chip in front of that chip, and other chips in contact with those chips. The ramp portion of the dimples thus has a primary purpose of providing a mechanism to position chips in front of the pusher portion prior to forward motion of the tray, whether the tray is inclined or vertical, and minimize chips from "backing up" as they engage the dimple. If dimples are not provided and the tray is highly inclined, the goods would tend to slide rather than move forward during the forward stroke of the tray. The objective of the dimples 20 is accomplished in an environment wherein the cleanliness of the food product is critical, and the cost of forming the dimples on the tray is not prohibitive.

The ramp portion of each dimple has several purposes. The ramp portion extends upward from the floor of the tray at a gradual angle of less than about 20°, and preferably from 12° to 18°, so that goods will move forward on the tray, are not blocked by the ramp portion for moving forward, but instead move up the ramp portion and then fall over the pusher portion, or are tilted or deflected sideways as they move up the ramp portion, so that once they pass by the pusher portion, the goods may fall back directly in front of the ramp portion. Again, this objective is accomplished in a manner which does not add substantial cost to the tray, and most importantly does not provide a solution to one problem while incurring other problems associated with maintaining a clean tray.

Referring again to FIG. 1, conveyor 10 as shown in FIG. 1 includes a height sensor 58 for determining the height (depth) of goods on the tray. This height indication may be obtained, for example, using an ultrasonic sensor which provides an output of the varying height of goods on the tray. The conveyor also includes a speed sensor 60 for determining the speed of goods moving along the tray. Various types of speed sensors may be used, including for example a simple stopwatch to detect the time for goods to move a known distance along the tray, thereby allowing the calculation of the speed of goods moving along the tray. For this purpose, a specially colored chip may be used to make an accurate determination of the time for that chip to move in a stack of chips along the tray. FIG. 1 also indicates a suitable position of one or more load cells 56 for measuring the weight of goods on the weighing tray 54.

With an accurate weight determination from the load cells and/or volume determination from the bed depth sensor, one still needs to calculate the travel rate of goods moving on the tray in order to determine, for example, the number of pounds of product being conveyed along the tray each minute or hour. As a backup to the weight determination, one may measure the bed height with the ultrasonic sensor, and take that volume calculation, combined with a known or presumed product density, to calculate the number of pounds of product being moved along the conveyor per minute or hour. Both the weight and volume density determinations require an accurate determination of the travel rate. As previously indicated, one of the factors that significantly affects the travel rate of product moving along a differential impulse conveyor tray is the varying bed height. Even though the bed height may be accurately determined, there is no simple formula for calculating an accurate travel rate as a function of bed height, since that determination is largely a function of the characteristics of the differential impulse conveyor and the product being conveyed.

Figure 7:
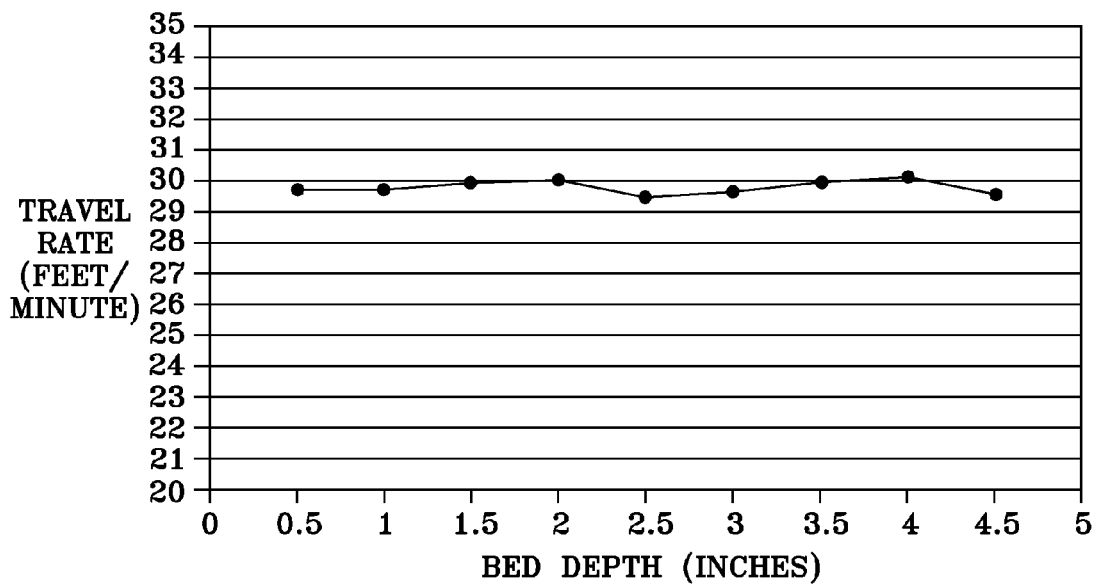
FIG. 7 is a chart illustrating the substantially uniform travel rate of goods along the conveyor with a varying bed depths.

One of the benefits of this invention is realized by providing a substantially constant travel rate of goods moving along the conveyor in spite of a varying bed density. The chart shown in FIG. 7 clearly illustrates a varying bed depth of from 0.5 to 4.5 inches, and a substantially constant travel rate of goods moving along the conveyor tray with the dimples. Thus a much more accurate determination of the amount of product transported by the conveyor, whether based upon a weight determination or a volumetric and product density determination, is enhanced by having a more uniform travel rate of product which is not significantly affected by a varying bed depth. Other factors may also affect the product rate, such as the composition of the product, e.g., the "oiliness" of the product, and conditions of the tray, whether rough or polished smooth, but again these factors do not negate a substantially constant travel rate of product along a conveyor tray with dimples as disclosed herein for that particular conveyor and that product.

FIG. 2 shows the feature of a conveyor inclined upwardly at an angle of approximately 8°. Blocks 19 incline the tray 12 at a desired angle, with the conveyor being otherwise similar to the conveyor shown in FIG. 1. In this application, the conveyor tray 12 has a floor with dimples 20, as shown in FIG. 16. Attempts to achieve this objective for most products with a differential impulse conveyor and a standard tray have not been successful since the goods tend to slide backward during forward movement of the inclined tray. By providing the dimples as disclosed herein, goods can be reliably moved uphill along an inclined tray, which has significant advantages for facilitating operations with machines having different product input heights. An inclined tray may be used, for example, to provide goods directly to a downstream machine, but the goods may also be diverted to a separate side conveyor so that product accumulates on the side conveyor and may subsequently be supplied to the machine at the same height. The product may thus be raised by the differential impulse conveyor to allow for accumulated product to be stored and later supplied to the downstream machine. A differential impulse conveyor tray may move product upward along the tray while at an angle of at least 3°, and in many applications, up an angle of from 4° to 6°. The maximum uphill angle will depend on the conveyed product characteristics, the density and pattern of the dimples, and the desired throughput of product per time.

Figure 14:
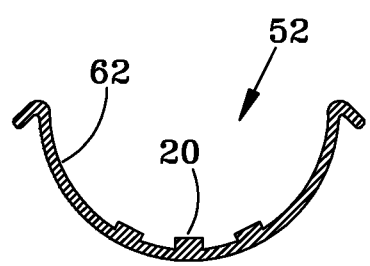
FIG. 14 illustrates dimples in a U-shaped tray.
Figure 15:
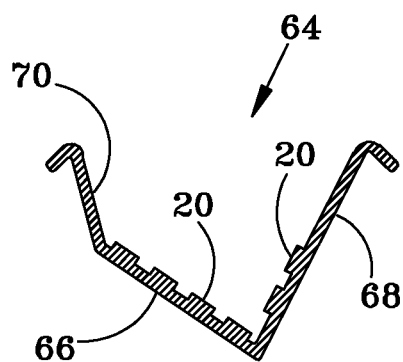
FIG. 15 illustrates dimples in a V-shaped tray.

FIGS. 14 and 15 illustrate alternative conveyor trays which include the dimple feature as disclosed herein. As shown in FIG. 14, conveyor tray 52 has a rounded bottom or floor 62. Tray 52 may be used, for example, as the receiving tray 52 shown in FIG. 1. A plurality of dimples 20 are provided in a lower portion of the tray 52, with the dimples being spaced laterally in rows and longitudinally in columns on the lower rounded portion of the tray to effectively move goods along the conveyor 52. FIG. 15 illustrates another type of tray 64, which may be referred to as a biased tray configuration, since the floor portion of the tray comprises angled planar floor 66, 68 and planar side 70. A plurality of dimples 20 are thus provided on a portion of angled floor 66 and on the angled floor 68 in rows and columns, and again reliably move goods along the length of the tray. In either case, the dimples project substantially upward from the curved or inclined surface of the tray.

Figure 9:
FIG. 9 is a side view of a dimple shown in FIG. 8.

FIGS. 8 and 9 disclose alternative configurations for a dimple 20. In the FIG. 8 option, the dimple 20 includes a pusher face 92 which has a face generally perpendicular to the direction of travel of the goods. The pusher face 92 is curved slightly to reduce the likelihood of goods passing by the edge of the pusher face. The ramp portion 94 is inclined and rounded on both the top surface and the front surface 96, so that the ramp portion of the pusher 20 shown in FIG. 8 resembles one quarter of a football. FIG. 9 is a longitudinal view illustrating the pusher face 92 and substantially planar ramp portion 94. The height of a suitable dimple may be from ⅛-⅜ inch, and the length of the dimple may be from ½-1 inch. Dimples only 5/16 inch long and 1/40 inch high have also been found to be effective. The preferred size and spacing of the dimples will depend in part on the product being conveyed.

Figure 10:
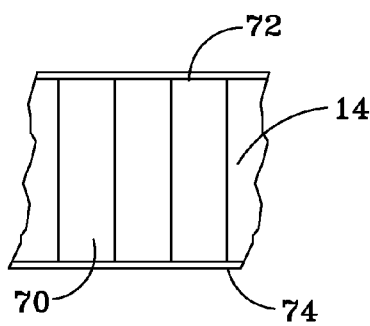
FIG. 10 illustrates a top view of a ribbed tray.
Figure 11:
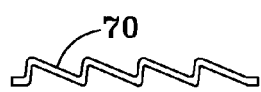
FIG. 11 is a side view of a rib shown in FIG. 10.

FIG. 10 is a top view of the tray with elongate dimples 70 extending laterally from tray side 72 to the opposing tray side 74. The elongate dimples 70 may also be referred to as ribs, and their cross-section is shown in FIG. 11. The ramp portion of each elongate dimple is thus substantially planar, and the pusher face 94 of each elongate dimple is also substantially planar. The elongate dimple of FIG. 11 may thus be similar in cross-section along the direction of travel of the goods to the dimple shown in FIG. 9, optionally with no planar surrounding surface between the elongate dimples.

Figure 12:
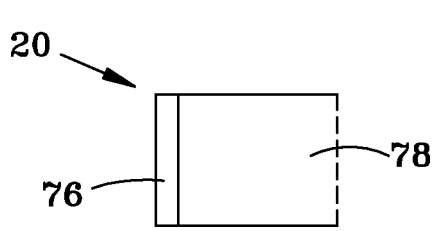
FIG. 12 is a top view another tray dimple.
Figure 13:
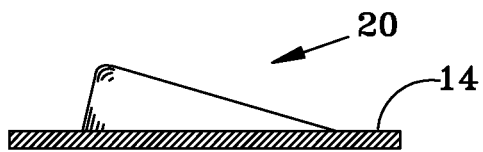
FIG. 13 illustrates a side view of the dimple shown in FIG. 12.

FIG. 12 illustrates yet another dimple 20 with a pusher face 76 and ramp portion 78 as previously discussed, although in this case the ramp is not curved and both the pusher face 76 and the ramp portion 78 are substantially planar surfaces. FIG. 13 is a side view of the dimple shown in FIG. 12.

A linear motion conveyor with a smooth pan bottom or floor can achieve 30 to 40 feet per minute travel rates with most products, although with a 5° to 7° pan floor incline, the rate drops to about 13 feet per minute, which for many applications is unacceptable. The above travel rates may be achieved by optimizing the fast/slow ratio of the drive for a smooth pan. This optimum ratio for a zero incline tray was between 2.4 to 2.6:1, i.e., the fast return of the pan is 2.4 to 2.6 times the slower forward movement of the pan. Travel rates for the dimpled pan as disclosed herein can be improved by optimizing the fast/slow ratios.

The dimpled design is inherently product specific. For example, potato chips tend to interlock so dimpled designs and spacing as shown in FIG. 16 are optimum. However, the travel rate of products that do no interlock, such as peas or beans, may be optimized using the design shown in FIGS. 10 and 11. In each case, to achieve maximum travel rates, both with horizontal and inclined pans, the fast/slow ratios may be optimized with a dimpled pan, and should be significantly greater than the travel rates achieved with a flat or non-dimpled pan.

As indicated above, various types of drive mechanisms may be used for powering the differential impulse conveyor. While support arms commonly extend upward from a conveyor base to the tray for a differential impulse conveyor, support arms alternatively could extend downward from a ceiling support, so that the pivoting arms still support the conveyor tray.

A particular feature of the invention is the use of the coining process to form the dimples in an otherwise planar tray floor. The dimensions of the dimple may be controlled such that surfaces of the tray floor are bent or deformed, although there is no separation in the top surface of the floor or the dimples which may detract from the cleanliness of the conveying operation. An alternative to forming the dimple in a metal tray floor is to form dimples in a plastic sheet, which effectively becomes the tray floor when it is secured to the floor of a metal tray.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A differential impulse conveyor for moving goods, comprising:
    a tray having a tray floor for supporting the goods, the tray being movable in a forward direction to move goods forward during tray forward movement, and movable in a backward direction to slide goods along the tray during tray backward movement;
    a drive motor for moving the tray floor in the forward direction and the backward direction; and
    the tray floor including a plurality of dimples each projecting upward from an adjacent product supporting surface on the tray floor, each dimple including a pusher portion extending upward from the product supporting surface for pushing goods forward during the forward movement of the tray, and a tapered ramp portion extending upward from the product supporting surface and engaging the pusher portion for moving goods in front of the pusher portion during backward movement of the conveyor tray;
    wherein the tapered ramp portion of each dimple includes angled side surfaces for deflecting at least some of the goods laterally away from a centerline of the dimple.

2. The differential impulse conveyor of claim 1, wherein each pusher portion projects upwardly from the product supporting surface at a rearwardly inclined angle from 50° to 90°.

3. The differential impulse conveyor of claim 1, wherein each pusher portion provides a substantially planar stop face which is substantially perpendicular to the direction of goods moving along the tray.

4. The differential impulse conveyor of claim 1, wherein the plurality of dimples are arranged on the tray in a plurality of rows and a plurality of columns.

5. The differential impulse conveyor of claim 1, wherein each of the plurality of dimples is an elongate dimple extending laterally substantially between opposing sides of the tray.

6. The differential impulse conveyor of claim 1, wherein the product supporting surface of the tray is inclined upwardly at an angle of at least 3°.

7. A differential impulse conveyor for moving goods, comprising:
    a tray having a tray floor for supporting the goods, the tray being movable in a forward direction to move goods forward during tray forward movement, and movable in a backward direction to slide goods along the tray during tray backward movement;
    a drive motor for moving the tray floor in the forward direction and the backward direction;
    the tray floor including a plurality of dimples each projecting upward from an adjacent product supporting surface on the tray floor, each dimple including a pusher portion extending upward from the product supporting surface for pushing goods forward during the forward movement of the tray, and a tapered ramp portion extending upward from the product supporting surface and engaging the pusher portion for moving goods in front of the pusher portion during backward movement of the conveyor tray; and
    a speed sensor for determining the speed of goods moving along the tray, the speed sensor including a timer to determine a time for goods to move a selected distance along the conveyor.

8. The differential impulse conveyor of claim 7, wherein the tapered ramp portion of each dimple includes angled side surfaces for deflecting at least some of the goods laterally away from a centerline of the dimple.

9. A differential impulse conveyor, comprising:
    a tray having a tray floor for supporting the goods, the tray being movable in a forward direction to move goods forward during tray forward movement, and movable in a backward direction to slide goods along the tray during tray backward movement;
    a drive motor for moving the tray floor in the forward direction and the backward direction;

the tray floor including a plurality of dimples each projecting upward from an adjacent product supporting surface on the tray floor, each dimple including a pusher portion extending upward from the product supporting surface for pushing goods forward during the forward movement of the tray, and a tapered ramp portion extending upward from the product supporting surface and engaging the pusher portion for moving goods in front of the pusher portion during backward movement of the conveyor tray;

a speed sensor for determining the speed of goods moving along the tray; and at least one of a height sensor for determining the height of goods on the tray and a load cell for measuring the weight of goods on the tray.

10. The differential impulse conveyor of claim 9, wherein the speed sensor for determining the speed of goods moving along the tray includes a timer to determine a time required for goods to move a selected distance along the conveyor.

11. A differential impulse conveyor for moving goods, comprising:

a tray having a tray floor for supporting the goods, the tray being movable in a forward direction to move goods forward during tray forward movement, and movable in a backward direction to slide goods along the tray during tray backward movement;

a drive motor for moving the tray floor in the forward direction and the backward direction; and the tray floor including a plurality of dimples each projecting upward from an adjacent product supporting surface of the tray floor and arranged on the tray in a plurality of rows and columns, each dimple including a pusher portion extending upward from the product supporting surface and providing a face which is substantially perpendicular to the direction of goods moving along the tray for pushing goods forward during the forward movement of the tray, and a tapered ramp portion extending upward from the product supporting surface and engaging the pusher portion for moving goods in front of the pusher portion during backward movement of the conveyor tray;

a speed sensor for determining the speed of goods moving along the tray; and at least one of a height sensor for determining the height of goods on the tray and a load cell for measuring the weight of goods on the tray.

12. A method of moving goods with a differential impulse conveyor, comprising:

providing a tray having a tray floor for supporting the goods, the tray being movable in a forward direction to move goods forward during tray forward movement, and movable in a backward direction to slide goods along the tray during tray backward movement;

powering a drive motor to move the tray floor in the forward direction and the backward direction;

providing a plurality of dimples on the tray floor each projecting upward from an adjacent product supporting surface of the tray floor, each dimple including a pusher portion extending upward form the product supporting surface for moving goods forward during forward movement of the tray, and a tapered ramp portion extending upward from the product supporting surface and engaging the pusher portion for moving goods in front of the pusher portion during backward movement of the conveyor tray;

determining at least one of the weight of goods on the tray and the height of goods on the tray;

determining the speed of goods moving along the tray; and determining the quantity of goods moving along the tray as a function of one or more of the determined height and the determined weight, coupled with the determined speed of the goods moving along the tray.

13. The method of claim 12, wherein the pusher portion provides a substantially planar face which is substantially perpendicular to the direction of goods moving along the tray.

14. The method of claim 12, wherein the dimples are arranged on the tray in a plurality of rows and columns.

15. The method of claim 12, further comprising:

moving goods along the conveyor tray upwardly inclined at an angle of at least 3°.

16. The method of claim 12, further comprising:

determining at least one of the weight of goods on the tray and the height of goods on the tray;

determining the speed of goods moving along the tray by:
providing a timer;
using the timer to determine the time required for the goods to move a selected distance along the tray; and
dividing the selected distance by the time required for the goods to move the selected distance.

* * * * *